May 18, 1965  A. C. MAGNUS  3,184,400
APPARATUS FOR THE TREATMENT OF SUBSTANCES WITH ULTRASONIC
VIBRATIONS AND ELECTROMAGNETIC RADIATIONS
Filed May 6, 1959  4 Sheets-Sheet 1
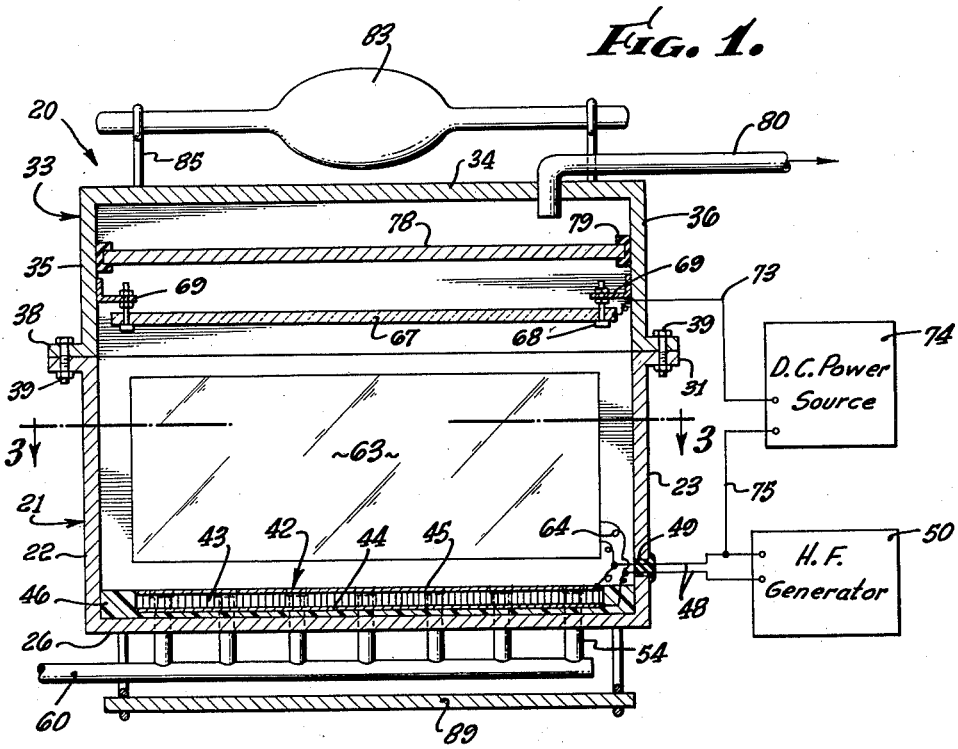
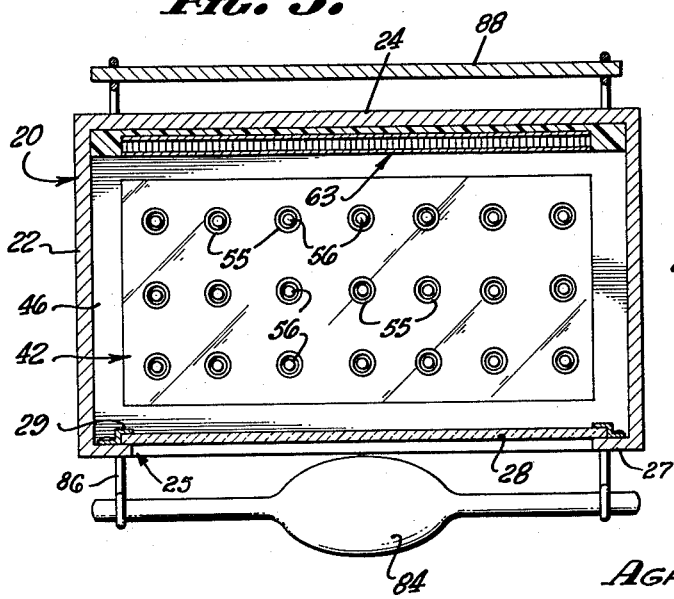
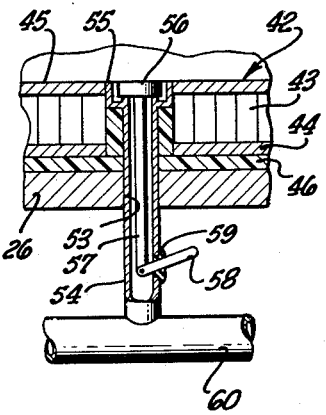
INVENTOR.
AGATHA C. MAGNUS
BY
Huebner & Worrel
ATTORNEYS.

May 18, 1965  A. C. MAGNUS  3,184,400
APPARATUS FOR THE TREATMENT OF SUBSTANCES WITH ULTRASONIC
VIBRATIONS AND ELECTROMAGNETIC RADIATIONS
Filed May 6, 1959  4 Sheets-Sheet 2
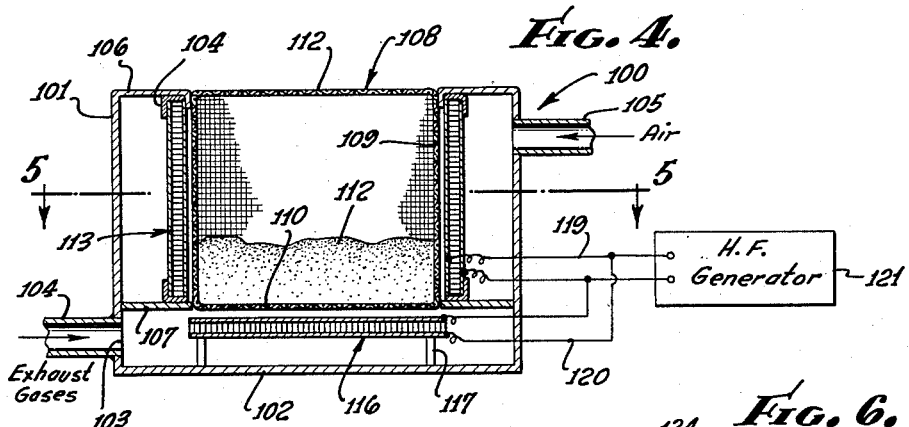
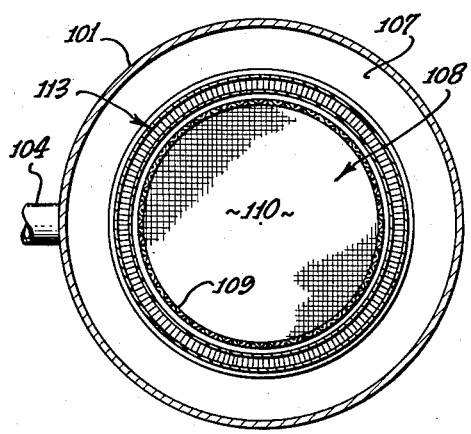
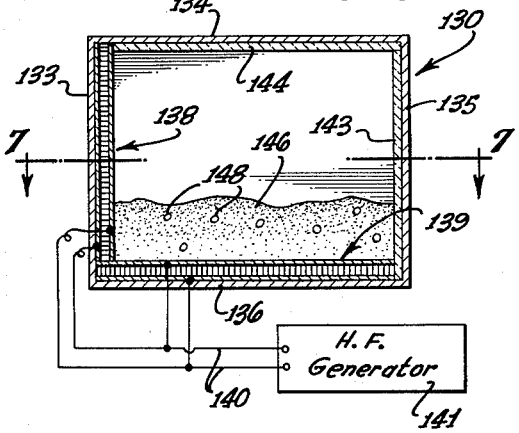
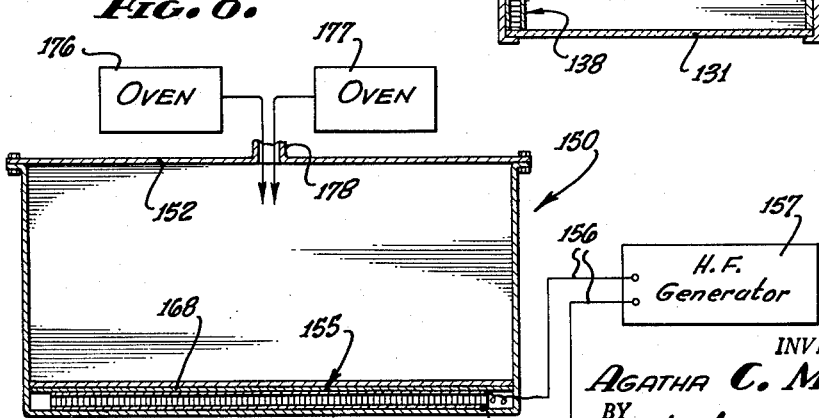
INVENTOR.
AGATHA C. MAGNUS
BY
Huebner & Worrel
ATTORNEYS.

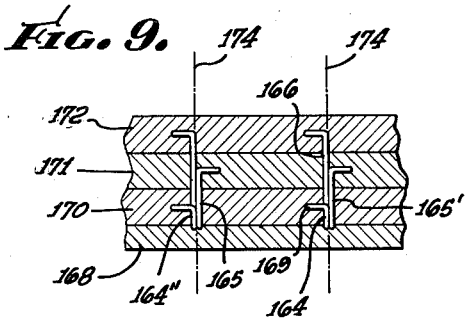
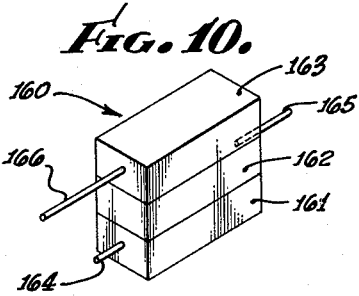
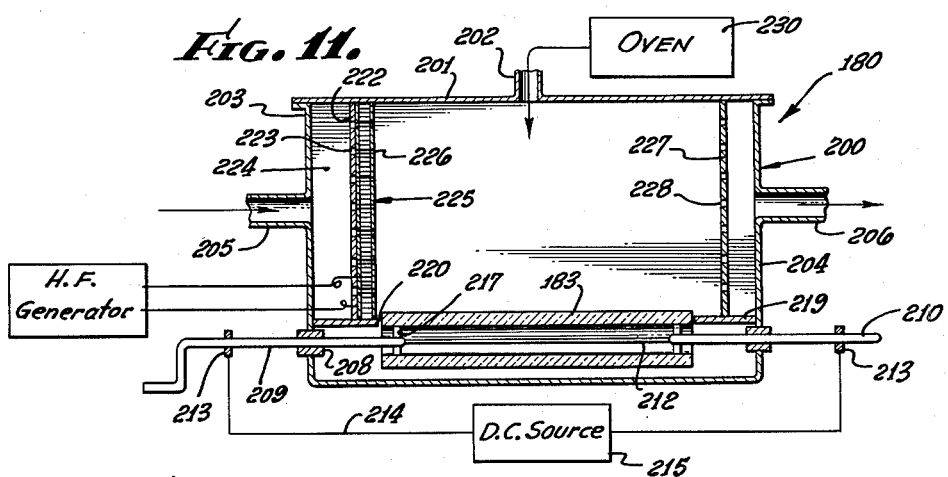
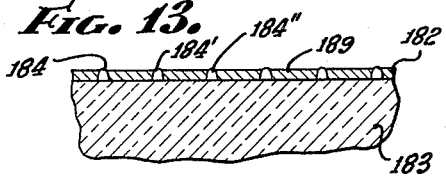
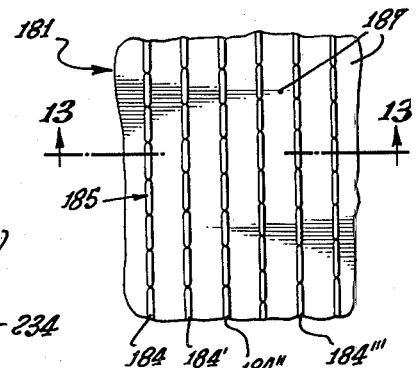
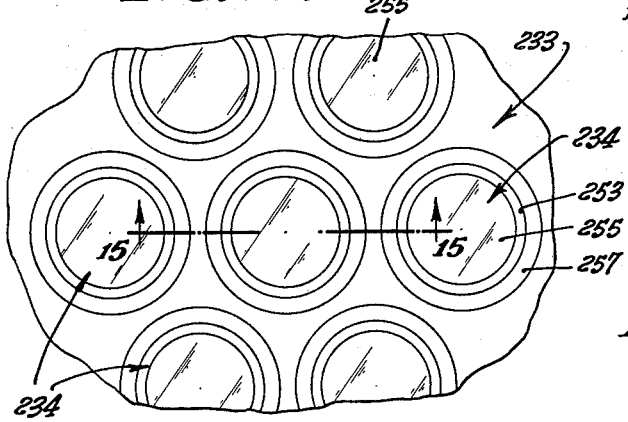

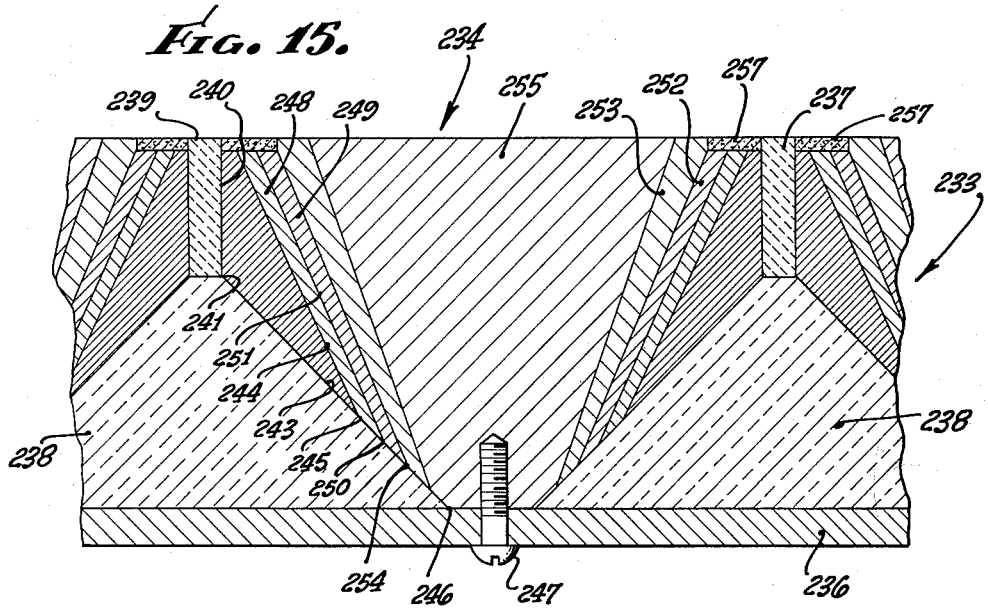
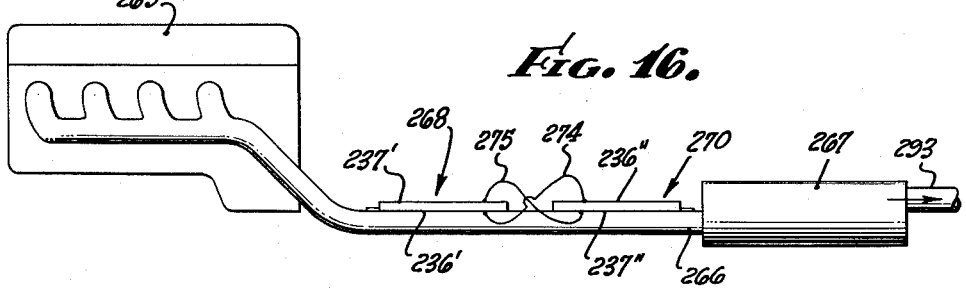
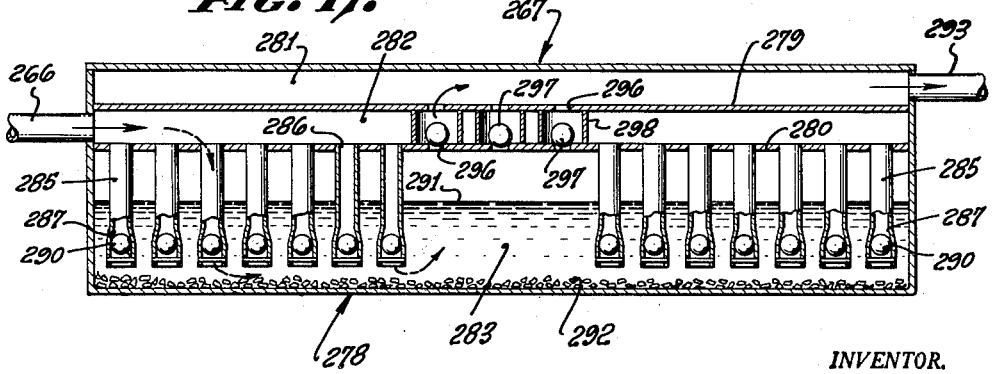

United States Patent Office 3,184,400
Patented May 18, 1965

3,184,400
APPARATUS FOR THE TREATMENT OF SUB-
STANCES WITH ULTRASONIC VIBRATIONS
AND ELECTROMAGNETIC RADIATIONS
Agatha C. Magnus, 430 La Loma Road, Pasadena, Calif.
Filed May 6, 1959, Ser. No. 811,496
2 Claims. (Cl. 204—193)

This invention relates to a method of subjecting substances to a three-dimensional pattern or lattice of electromagnetic radiations and of ultrasonic waves and of combinations of such ultrasonic and electromagnetic lattices for causing chemical combinations, crystallization, polymerization, electrical stressing, formation of P and N type crystals, change of state, and selective distribution of substances. The invention further relates to apparatuses employing the method of this invention.

The geometrical configuration and hence certain characteristics of all chemical bodies, i.e. inorganic substances such as metals, dielectrics, and semiconductors, and organic substances (e.g. plastics), and inorganic and/or organic semiconductors and catalysts, depend on the proportional distribution in their structure of the three different types of bonds, i.e. the covalent, the covalent-metallic and the ionic bond.

According to this invention, the configuration of substances is controlled and ordered by means of building into space a "wave-crystal" or "three-dimensional lattice," of standing waves, either electromagnetic or ultrasonic or with standing waves of concerted wave lengths of both electromagnetic and ultrasonic waves providing nodal points which will also be the points of maximum stability of corpuscles, molecules, atoms and electrons. In the present state of the art, it may not be possible to create all types of such lattices with nodal points being established exactly at the desired positions of the particles of the substance to be treated or formed, but the lattices which may at present be created are sufficient to accommodate any unstable constituents of a molecule and a sufficient number of stable constituents thereof to enable reproduction of a configuration for the substance to be formed.

A lattice of electromagnetic radiations, e.g. X-rays, will provide a wave crystal having the requisite atomic distances from node to node thereof, will provide internal and external ionization fields which can tear molecules, atoms and electrons out of their bonds and force them into new bonds, and will provide bonding charges.

A three-dimensional lattice of standing ultrasonic waves will provide phonons (vibrational heat of a chemical body) and traps (energy freed by donors and acceptors), and mechanical and electrical stresses, and causes bunching and friction of particles, molecules, atoms and electrons against one another, thereby to order and hasten alignment and mating of the particles, molecules, etc., as is required, for example, for polymerization. Also in the case of triboluminescent materials such bunching and friction of particles causes light.

By this invention it is possible to form new chemical compounds and to more easily produce existing compounds. Certain chemical reactions may be inhibited according to this invention. This invention may be adapted to produce light, called "cold light," by a means employing the phenomenon of triboluminescene. Semiconductors may be formed according to this invention. Selective distribution of powders as, for example, distribution of magnetic needles and manufacture of crystals for the mosaics which are described in my copending application, Serial No. 734,652, filed May 12, 1958, now United States Patent No. 3,142,561, may be controlled by this invention. Also, it is possible by this invention to form mosaics for Peltier heat-pumping and electricity generating effects.

In this specification the particulars of the method of this invention and the details of construction and mode of operation of apparatus embodying this invention are described with reference to the accompanying drawings, in which:

FIG. 1 is a central vertical section through an apparatus embodying this invention and especially adapted for subjecting substances to an electromagnetic and ultrasonic lattice of this invention for forming chemical compositions;

FIG. 2 is a detail section of a portion of the apparatus;
FIG. 3 is a transverse section through the apparatus taken on line 3—3 of FIG. 1;
FIG. 4 is a central vertical section through a muffler of this invention;
FIG. 5 is a cross section taken on line 5—5 of FIG. 4;
FIG. 6 is a central vertical section through an apparatus of this invention adapted to produce light by the phenomenon of triboluminescence;
FIG. 7 is a cross section taken on line 7—7 of FIG. 6;
FIG. 8 is a schematic representation of an apparatus for forming semiconductors according to this invention, a certain tank of the apparatus being shown in central vertical section;
FIG. 9 is a detail section through a portion of the tank of FIG. 8;
FIG. 10 is a perspective view on an enlarged scale of a transistor as formed by the apparatus of FIG. 8;
FIG. 11 is a diagrammatic representation of an apparatus for forming mosaic panels according to this invention, a tank of such apparatus being shown in central vertical section;
FIG. 12 is a plan view on an enlarged scale of a portion of a mosaic panel;
FIG. 13 is a cross section taken on line 13—13 of FIG. 12;
FIG. 14 is a plan view on an enlarged scale of a portion of another mosaic panel of this invention;
FIG. 15 is a cross section on an enlarged scale taken on line 15—15 of FIG. 14;
FIG. 16 is a diagrammatic view of an exhaust gas system for an internal combustion engine employing mosaic panels of the type shown in FIGS. 14 and 15; and
FIG. 17 is a central vertical section on an enlarged scale through a gas filter of the system of FIG. 16.

Forming chemical compounds

According to this invention new chemical compounds may be formed in a space lattice of crossed electromagnetic radiations and ultrasonic vibrations as described hereinafter. In FIG. 1 of the drawing there is shown an apparatus of this invention for forming hexafluorobenzene according to the following chemical equation:

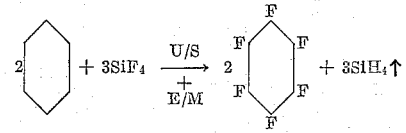

The above equation represents the reaction of a mixture of liquid benzene and silicon tetrafluoride when subjected to ultrasonic vibrations (abbreviated as U/S) and electromagnetic waves (abbreviated as E/M), according to this invention, to form hexafluorobenzene. The new compound (hexafluorobenzene) is a non-fusible, translucent, solid, three planar polymerization product, insoluble in any known solvents. It has a tensile strength of at least 2,000 p.s.i., and is extremely hard. As examples of its uses, it may be used to form electrets (the electric analogue of a magnet), self-lubricating gears, and apparatus for extremely high temperatures.

In FIGS. 1–3 of the drawing there is shown an apparatus designated generally by reference numeral 20 adapted to form hexafluorobenzene according to this invention. The apparatus comprises a box-like container having end walls 22 and 23, side walls 24 and 25, and a bottom wall 26. The end walls and bottom wall and side wall 24 of the container 21 may be formed of any suitable material, e.g. steel. Side wall 25 comprises a narrow rectangular frame portion 27 defining an opening which is spanned by a plate 28 of polished steel, the plate 28 being secured to the inside of the frame 26 as by means of an angle iron 29 which is welded or otherwise suitably secured to the inside of the frame portion 27. There is a flange 31 extending outwardly from around the top rim of the end and side walls of the container for mounting a cover 33 upon the container 21. The cover comprises a top wall 34, end walls 35 and 36 and side walls, there being a peripheral flange 38 extending outwardly from the rim of the walls of the cover for securing the cover upon the container as with bolts 39.

Upon the inside surface of the bottom wall 26 there is an ultrasonic transducer means 42 for emitting ultrasonic waves upwardly in the container. In the illustrated embodiment the transducer means comprises a multitude of separate piezoelectric crystals 43, e.g. barium titanate crystals. The crystals are secured upon an electrode plate 44 and upon the opposite ends of the crystals 43 is another electrode plating 45. The assembly of crystals disposed between electrode plates is adhered to and electrically insulated from the inside surface of the bottom wall 26 by means of a layer 46 of non-conducting materials, e.g. plastic. The electrode plates 44 and 45 are connected to leads 48 passing through seals 49 in the end wall 23, the leads being connected to the terminals of a high-frequency alternating current generator represented at 50.

The bottom wall of the container has a plurality of uniformly spaced apart openings 53 extending therethrough and these openings continue through the transducer means 42 for receiving pipes 54 whereby a gas, in this case, the silicon tetrafluoride may enter the container. Each pipe 54 has an enlarged cup-shaped upper end 55 for accommodating a head 56 of a poppet valve having a stem 57 extending axially in the pipe. The stem is pivotally connected to a lever 58 which extends through a suitable seal 59 formed in the pipe below the bottom wall of the container whereby the poppet valve may be opened by pressing down on the outer end of the lever. The lower ends of the pipes 54 are connected to a manifold 60 by which the silicon tetrafluoride is caused to flow into each of the pipes 54.

Upon the inside surface of the side wall 24 of the container is another transducer layer 63 which is similar to the transducer means 42 on the bottom wall of the container except that the transducer means 63 does not have any openings extending therethrough such as the openings 53 for accommodating the pipes 54. The electrodes of the transducer layer 63 are connected by leads 64 to the leads 48 whereby the transducer crystals of the layer 63 will be excited simultaneously with the excitation of the crystals of the transducer layer 42. In the illustrated embodiment the plane of the transducer layer 42 is perpendicular to the plane of the transducer layer 63 and the container in which these transducer layers are mounted is of such dimension that the ultrasonic waves which are emitted from the layer 63 will cross the ultrasonic waves from the transducer layer 42 at the nodes of the respective waves.

The plate 28 which forms the greater part of the side wall 25 of the container is parallel to the plane of the transducer layer 63 and is spaced from the transducer layer 63 by a distance which is a whole number multiple of the wave length of the utrasonic waves emitted by the transducer layer 63 whereby the plate 28 will serve as a reflector for the waves from transducer layer 63. Thus, the reflected waves will be in phase with the emitted waves whereby standing waves of utrasonic vibrations between the transducer layer 63 and the steel reflector plate 28 will be created.

For reflecting the ultrasonic waves emitted by the transducer layer 42, there is another plate 67 of polished steel extending transversely of the cover 33 and mounted on the inside thereof by means of adjustable fasteners or bolts 68 on insulator lugs 69, the lugs being welded or otherwise suitably secured to the insides of the walls of the cover. As in the case of the reflector 28, the reflector plate 67 is spaced from the transducer layer 42 by a distance which is a whole number multiple of the wave length of the ultrasonic vibration emitted by the transducers of the layer 42 thus to create standing waves between the reflector plate 67 and the bottom transducer layer. Both plates 28 and 67 are adjustable for perfect tuning to allow for changes of temperature and consistence of the processed material.

The reflector plate 67 is connected by lead 73 to one terminal of a direct current power source 74. Another lead 75 from the power source is connected to the electrode plate 45, for creating an electrostatic field in the container between the electrode plates 67 and 45.

Above the reflector-electrode plate 67 is a membrane or sheet 78 which spans the inside of the cover, the sheet 78 being secured around its periphery to the insides of the cover walls by seals 79. The membrane 78 is one in which gases are selectively soluble. For forming of hexafluorobenzene according to this invention, the sheet 78 may be formed of tetrafluoroethylene resin (marketed under the trade name "Teflon") which is permeable to monosiane but impermeable to silicon tetrafluoride. Thus, when the chemical reaction referred to above proceeds, the reactant tetrafluoride will remain in the container and will not pass through the membrane 78 whereas the resultant monosiane will permeate through the membrane 78 and be exhausted through an outlet 80.

For creating a lattice formation of electromagnetic waves within the container, the illustrated embodiment employs X-ray tubes 83 and 84, one of which is mounted as with brackets 85 above the top wall 34 of the cover and the other X-ray source 84 being mounted as with brackets 86 to the side wall 25 of the container whereby the radiations emitted from each of the sources will cross each other. The X-ray tubes are so disposed with respect to each other that their respective radiations will cross at the nodes thereof. Also, the above mentioned lattice of ultrasonic waves from the transducer assemblies 42 and 63 is so created with respect to the lattice of the X-rays that the nodal points of wave crossing in the ultrasonic lattice will be disposed at the nodal points of crossings in the electromagnetic lattice produced by the X-ray tubes. The wave lengths of the X-rays are substantially shorter than the wave length of the ultrasonic waves, and accordingly, each point of crossing in the electromagnetic lattice will not have a corresponding point of crossing in the ultrasonic lattice. For the purposes of this invention the ultrasonic waves are generated such that their wave lengths are whole number multiples of the wave length of the X-rays whereby the points of crossing in the ultrasonic lattice will occur only at points of crossing in the electromagnetic lattice.

It is desirable to provide barriers for limiting the extent to which the X-rays are emitted beyond the apparatus, and to this end, a lead plate 88 is mounted upon the outside of wall 24 to serve as a barrier for X-rays emitted by tube 84, and another lead plate 89 is mounted below the bottom wall 26 to serve as a barrier with respect to the rays emitted by tube 83.

To form hexafluorobenzene by the apparatus 20, according to this invention, the container 21 is filled with liquid benzene and the cover 33 is then sealed tight upon the container. The X-ray and ultrasonic lattices described above are then established by energizing the power source 50 and the X-ray tubes. Silicon tetrafluoride is then bubbled into the benzene through the manifold 60 and up through the pipes 54. The energy required for the addition of fluorine atoms to the benzene is supplied by the electromagnetic lattice and the phonons are supplied by the ultrasonic lattice. Because the ultrasonic lattice is superimposed upon the ultrasonic lattice falling at points of crossing in the electromagnetic lattice, the ultrasonic waves will cause the molecules of hexafluorobenzene, which are being formed, to became arranged with respect to each other so as to fit together perfectly with each surface or side of each molecule being matched with corresponding sides, respectively, of its next adjacent molecules. When it becomes apparent, by viewing through an inspection port in a wall of the container, that the hexafluorobenzene is polymerizing, the wave lattices may be discontinued, for the reaction will continues to completion. After the supply of silicon tetrafluoride has been shut off as by closing the inlet waves through operation of lever 58, the cover 33 may be removed for access to the solid product. Wall 23 may be an extrusion die covered by a sealing plate which is removed while the compound is still plastic. Wall 22 may have an actuating clyinder which may be operated to force the plastic material through the die or into molds.

Though the illustrated apparatus contains but two X-ray tubes, it is to be understood that any convenient number thereof may be employed outside each of the walls 24 and 25. Also, for forming compounds of different crystalline structure the lattices may be tilted as by increasing the angle of the transducer layer 63 with respect to the transducer layer 42.

The illustrated apparatus 20 is further adapted to impart electret properties to the product while the same is being formed, i.e. the crystals of the hexafluorobenzene are electrically stressed to acquire polarization. As the molecules of hexafluorobenzene are being formed, the plates 67 and 45 are energized by a strong electric field produced by the direct current power source 74 to orient the molecules in the direction of the field.

When hexafluorobenzene with electret qualities has been produced in sufficient quantities, the apparatus 20 can be formed of this material, so that its walls can be agitated ultrasonically by electrostriction, whereby no transducers are required.

Inhibition of Chemical Processes

According to this invention, it is possible to inhibit or prevent undesired chemical reactions from occurring. For the purposes of illustrating a practical application of this phenomenon, there is illustrated in FIGS. 4 and 5 of the drawing a muffler, designated generally by reference numeral 100, and adapted to be connected to the exhaust of an internal combustion engine for converting any uncombusted products in the exhaust to carbon dioxide.

Muffler 100 comprises an outside cylindrical shell 101 having a bottom wall 102. At its lower end the shell has an opening 103 to admit exhaust gases from an exhaust pipe 104. At its upper end the shell is open to a pipe 105 for admitting air under pressure to within the muffler. Two annular walls 106 and 107 serve to mount a screen cage 108 within the muffler shell. The screen cage comprises a cylindrical side wall 109 and end walls 110 and 112. The cage is formed of fine mesh and contains a catalyst in the form of pellets 112 (30 microns or larger in size) of platinum activated alumina, for example.

Circumscribing the side walls 109 of the wire cage is a cylindrical transducer assembly 113 which is similar in construction to the transducer assembly 42 described above, the same being mounted as with brackets 114 to the annular walls 106 and 107. There is another transducer assembly 116 mounted as on supports 117 below the bottom wall of the wire cage. The plates of transducer assemblies 113 and 116 are connected by leads 119 and 120 to a high-frequency generator which is represented at 121.

It will be apparent that the cylindrical form of the transducer assembly 113 will produce a heterogeneous formation of ultrasonic waves within the cage 108. The waves are directed radially inwardly of the wire cage and any reflection thereof will be out of phase with the initial waves whereby no standing waves are created. Also the ultrasonic waves emitted into the wire cage by the transducer assembly 116 will pass through the wire screen of the top wall of the wire cage whereby no standing waves are created. Inasmuch as the wave formation produced by the cylindrical transducer assembly 113 is composed of waves travelling in all directions, there will be no matching of nodes of waves from transducer assembly 116 with the nodes of waves from transducer assembly 113. In the absence of nodal crossing points for the waves and because the catalyst pellets are being constantly agitated within the cage by the ultrasonic waves, there will be no settling of chemical reaction products upon the catalyst surfaces thereby avoiding poisoning of the catalyst.

Often in the case of catalysts, a chemical change of the surface layer occurs accompanied by the appearance of semiconductor characteristics. As only the surface of the catalyst is effective in promoting a chemical reaction, any impurities entering the surface film will disadvantageously affect the catalyst potential. In the case of exhaust gases from an internal combustion engine, lead impurities, for example, are apt to settle into the surface of the platinum film of the catalyst. The ultrasonic wave formation of interfering wave fronts will inhibit poisoning of the catalyst by impurities and other reactant products with the result that the catalyst remains pure over a long life span during which the catalyst promotes complete reaction of the oxygen in the air from inlet 105 with the uncombusted products in the exhaust gases from inlet 103. It will be understood, of course, that the waste carbon dioxide is discharged through the foraminous top wall 112, the pores of which are small enough to retain the catalyst pellets within the muffler.

Production of cold light

According to this invention, it is possible to create "cold light" by subjecting triboluminescent substances to a three-dimensional lattice formation of ultrasonic waves.

In FIGS. 6 and 7 of the drawings, there is shown an apparatus, designated generally by reference numeral 130, for producing such light for ornamental or other desired purposes. Apparatus 130 comprises a hollow hermetically sealed rectangular box-like structure having front and rear panels 131 and 132 and four end walls 133 to 136, respectively. At least one of the panels 131 and 132 is formed of a translucent material, e.g. hexafluorobenzene, or of transparent material, e.g. glass or quartz. Upon end wall 133 there is mounted a transducer assembly 138 which is substantially identical to the transducer assembly 42 hereinabove described in detail. Also on the inside of end wall 136 there is another transducer assembly 139. The transducer assemblies are connected by leads 140 to a high-frequency generator represented at 141.

Alternatively, the walls of the apparatus 130 may be formed of hexafluorobenzene with electret properties whereby no transducers are required, as the walls themselves can be agitated by electrostriction.

Opposite the end wall 133 there is a reflector plate 143 of glass or quartz, and a similar reflector plate 144 is secured on the inside of end wall 134. If desired, the reflector plates 143 and 144 may be formed to constitute the end walls 135 and 134, respectively. The spacings between opposite end walls in the apparatus are whole number multiples of the ultrasonic waves whereby a three-dimensional lattice of waves having points of crossing at the nodes of the waves will be formed within the apparatus, as has been described hereinbefore.

Within the apparatus is a quantity of triboluminescent powders of about one micron size, e.g. activated zinc sulfide, quartz, sugar crystals, and calcium chloride. The powders are designated by reference numeral 146. Also contained within the apparatus is a quantity of small spheres 148 of semiconductor materials, e.g. organic cyanides, naphthalene and benzenthrone, and metallic semi-conducting alloys. The spheres 148 may also be formed of "Lucite."

Upon energization of the transducer assembly, the lattice of ultrasonic waves will cause distribution of the triboluminescent powders throughout the inside of the apparatus and will agitate the spheres 148 to produce luminescence or cold light by friction between the spheres and the powders without too great a rise in temperature.

Manufacture of semiconductors

Referring now to FIGS. 8–10, there is illustrated an apparatus, designated generally by reference numeral 150, designed for forming semiconductors for transistors, according to the concept of this invention.

Apparatus 150 comprises a tank 151 formed of zirconia, for example, having a lid 152 sealed on the tank as by bolted flanges 153 to close the tank. Upon the bottom wall of the tank is an ultrasonic transducer assembly 155 of a structure similar to that described hereinbefore for the transducer assembly 42. The transducers may be of zirconium zincide or gallium-arsenide, for example, which keep their piezo-electric properties at high temperatures. The assembly 155 is connected by leads 156 to a high-frequency alternating generator represented at 157.

The apparatus 150 is described herein as the same may be used for manufacturing semiconductor transistors 160 (FIG. 10) of gallium-arsenide. The illustrated transistor of FIG. 10 comprises an emitter layer 161 of negative or N-type character, a base layer 162 of positive or P-type, and a collector layer 163 corresponding to the layer 161, i.e. of N-type. Alternatively, the outside layers may be of P-type and the middle (base) layer of N-type. The emitter layer has a wire terminal 164 of beryllium-copper, for example, of about .0015" diameter attached thereto. The base layer has a wire terminal 165 of gold, for example, of about .0015" diameter attached thereto, and the collector layer has a wire terminal 166 of Phosphor bronze, for example, attached thereto, the several terminals serving to connect the transistor in an electronic circuit as is well understood by those skilled in the art.

To form the transistors 160 with the use of apparatus 150, a thin support sheet 168 of zirconia or asbestos, for example, of about one-half inch in thickness, is placed upon the top of the ultrasonic transducer assembly 155. Referring to FIG. 9, it will be seen that the sheet 168 has a plurality of terminal wires projecting upwardly therefrom. The terminal wires are arranged in rows on the sheet 168 so that after the transistor layers 170, 171 and 172 are formed upon the sheet, they may be cut along the rows of the terminal wires to form transistors 160 with the terminal wires secured to the respective layers of each transistor. Wire 164 extends upwardly from the sheet 168 and is bent at end portion 169 thereof at a level corresponding to about the medial plane of the layer 170 to be formed, the layer 170 providing the emitter layer 161 for the plurality of transistors 160 to be formed. Wire 166 extends up to a level at which the layer 172 (for collector layer 163 of the transistors) will be formed and wire 165 extends up to about the middle for layer 171 (for base layer 162). After the three layers for the transistors are formed, as described hereinafter, the sheet 168 with the transistor layers on it is removed from the tank so that the transistor layers may be stripped from the sheet. The layers are then cut through along lines 174 to form the individual transistors. The stem portions of the terminal wire may then be bent out from the end surfaces of the transistors, as shown in FIG. 10.

Reference numeral 176 designates an oven for sublimating gallium and numeral 177 designates another oven for sublimating arsenic. The gaseous gallium from oven 176 and arsenic from oven 177 are passed through an opening 178 formed in the lid of the apparatus 150. These gases will solidify as a gallium-arsenide semiconductor layer 170 upon the sheet 168. A homogeneous mixture of the gallium and arsenic results from agitation of the gaseous molecules produced by the waves emitted from the ultrasonic transducer assembly 155. As the P or N types of a semiconductor material such as gallium-arsenide depends on the slight displacement of the stoichiometric proportion of the two materials, in the first case towards a preponderance of gallium, in the second, towards a preponderance of arsenic, it has been established that a slower rate of solidification favors the formation of N-type material, while a faster rate of solidification favors the formation of P-type material. The rate of solidification can be controlled by the duration of the ultrasonic agitation by the transducer assembly 155. Its duration will be longer, if N-type material is desired, and shorter, if a P-type layer is desired. An electret stress may be imparted to the transistors during solidification of each layer after the ultrasonic agitation has been stopped, as by means of spaced electrode plates as mentioned hereinbefore.

Manufacture of photoelectromagnetic cells of the type described in my copending application, Serial No. 734,652

Referring to FIGS. 11, 12, and 13 of the drawing, there is shown an apparatus, designated generally by reference numeral 180, for forming a photoelectromagnetic mosaic 181 according to this invention.

The illustrated mosaic panel comprises a mosaic film 182 upon the outside surface of a quartz tube 183. The mosaic film 182 comprises a series, extending from end to end of the tube, of axially spaced apart rows 184, 184', 184" etc. of dendrites 185, the rows encircling the quartz tube. The spaces between adjacent rows of dendrites are designated by numeral 187. After the rows of dendrites have been deposited upon the quartz tube, a layer 189 of semiconductor material, e.g. gallium-arsenide, is deposited in a manner as described above in the description of apparatus 150. Following deposition of the semiconductor layer 189, the same is machined down to the level of the dendrites, thereby to expose the dendrites on the outside surface of the mosaic.

Apparatus 180 comprises a tank 200 of rectangular cross section having a lid 201 with an opening 202. Opposing side walls 203 and 204 of the tank have inlet opening 205 and outlet opening 206 formed therein, respectively for passing an inert gas, e.g. nitrogen, through the tank. Above the bottom wall of the tank, the side walls 203 and 204 have sealing bearings 208 for rotatably supporting steel rods 209 and 210 extending through the walls. The inner ends of the rods are interconnected by an electric wire 212 which may be insulated with fiber glass impregnated with phosphates (e.g. Hotrock), for example. Slip rings 213 upon the outer end portions of the rods are connected through leads 214 to a source 215 of direct current. Also upon the inner ends of the rods 209 and 210 are spider supports 217 for mounting the quartz tube 183 within the tank.

A partition 219 within the tank defines an opening 220 exposing the quartz tube. A wall 222 having gas passageways 223 formed therein is spaced inwardly from the side wall 203 thereby defining a manifold chamber 224 for passage of the cooling nitrogen gas into the tank.

Upon the inside of the wall 222 is a transducer assembly 225 corresponding to that described above for the transducer assembly 42 of the apparatus shown in FIG. 1. The transducer assembly 225 has openings 226 formed therein and aligned with the openings 223 in the wall 222 to allow passage of the cooling gas through the transducer assembly.

Spaced inside the side wall 204 is a polished steel plate 227 having openings 228 to allow exhaust of the cooling gas. The plate 227 serves as a reflector for the ultrasonic waves emitted by the transducer assembly 225 thereby to form standing waves between the transducer assembly 225 and its reflector 227. Another side wall of the tank has a transducer assembly secured on the inside thereof to direct ultrasonic waves to its opposite wall thereby to form standing waves extending transversely of the waves produced by assembly 225. A lattice of crossed standing waves is thus produced, as described hereinbefore, with the waves crossing each other at their nodes.

For forming the dendrites, sublimated iron is introduced into the tank through opening 202 from an oven represented diagrammatically at 230. As the gaseous iron enters the tank, it will be agitated by the ultrasonic lattice and cooled by the gas passing through the tank with the result that the dendries 185 will form and become deposited upon the hot outside surface of the quartz tube 183. The quartz tube will have a thin outside film of molten quartz due to the heat within the tank and the dendrites will therefore stick to the outside surface of the tube. As the dendrites are deposited, they are subjected to the influence of the magnetic field created by the wire 212 and will become aligned in spaced apart rows as the quartz tube is rotated by the rods 209 and 210. Inasmuch as the dendrites are formed in the ultrasonic lattice while being subjected to the influence of the magnetic field produced by the current passing through the wire 212, the dendrites will become permanently magnetized. For a fuller description of the nature of the dendrites employed herein, reference may be had to an article entitled "Magnetic Materials Push Back Design 'Stops'" by William Arrott, published in the magazine "Electrical Manufacturing," January 1957, starting at page 62.

After the magnetic dendrites have been deposited in rows upon the surface of the quartz tube, the tube may then be placed in an apparatus such as that of apparatus 150 (FIG. 8) for depositing the layer 189 of semiconductor material upon the surface of the quartz tube. Following deposition of such semiconductor layer, the surface thereof is machined down to expose the dendrites 185. The tube may be cut into drums for use as mosaics of the type described in my copending application, Serial No. 734,652.

If sintered mixed metal and ceramic memories are to be produced, dendrites may be employed, as explained above, but instead of forming a mosaic upon a revolving tube, the same may be formed in sheet form with ceramic powder (e.g. barium titanate), as explained above in connection with that part of the description in which reference is made to FIG. 11 of the drawing. The ceramic powder is placed in a container on the transducers. The transducers will cause standing waves. The heavy dendrites will settle in the nodes of the waves and the lighter ceramic powders will be moved aside to provide space for the dendrites. When the dendrites have formed in sufficient number, the form is moved carefully to a sintering oven, so that the distribution remains undisturbed.

A flexible magnetic tape may be produced by the process described immediately above, except that the dendrites may be deposited on a thin sheet in ribbon or tape form of asbestos, for example, or hexafluorobenzene. Such tape may be employed, for example, for mounting loose sheets of paper in a notebook cover. One edge of each sheet of paper to be inserted as a page for such notebook will have a magnetic powder deposited thereon either by engraving plating or by spraying a fine powder (e.g. 500 mesh), of iron, for example, dispersed in a lacquer cut with a thinner. Hardening of the lacquer will retain the fine powder on the edge of the paper whereby paper will adhere along its edge to the magnetic film on the inside of the notebook binder. Thus, pages of the notebook may be inserted and removed as desired without having to remove other pages of the notebook.

*Formation of mosaics for Peltier heat-pumping and generation of electricity*

Referring to FIGS. 14 and 15 of the drawing, there is shown a panel designated generally by reference numeral 233 comprising a mosaic of uniformly disposed semiconductor elements 234 formed therein. Panel 233 comprises a laminated strip having an outside rhodium electrode plate 236, a sheet 237 of rhodium as another electrode plate, and a middle layer 238 of beryllium oxide. Extending inward from the outside surface 239 of the sheet layer 237, the laminated panel has a plurality of spaced separate holes 240 formed therein, the same being cylindrical to a depth 241 and then extending to the inside surface 242 of layer 236 as a frusto-conical cone defined by wall 243. Alternatively, the holes 240 may be of polygon cross section for containing the semiconductor elements.

To form the transistors 234 within the holes 240, as shown in FIG. 15, the laminated panel is positioned within an apparatus 150 of FIG. 8. A masking plug (not shown) is placed within each hole 240, each masking plug having outside surfaces thereof corresponding to conical surface 244 down to circle 245 of hole 240, and having a frusto-conical surface on the end portion of the masking plug conforming to the surface of the bore between circle 245 and end 246 where the plug will seat flush on the top surface 242 of the rhodium electrode plate 236. A screw 247 may be employed to secure the plugs in the holes for the transistors.

A layer 248 of N-type semiconductor is then deposited in the panel holes to fill the space between the masking plug and the walls defining the transistor holes. Following formation of an N-type layer 248, a layer 249 of P-type semiconductor is formed to extend down to level 250 using a suitable plug to define the inside surface 251 for the P-type layer. A layer of paraffin is then deposited in the space designated by numeral 252. Following formation of the paraffin layer, another layer 253 of P-type semiconductor is deposited to extend down to level 254 short of the electrode plate 236. After P-type layer 253 has been formed, the inside thereof is filled with a truncated cone of N-type semiconductor 255 in contact with the upper surface of the electroplate 236.

After the several transistor layers have been machined down to the plane of the top surface 239, the mosaic is placed within a chamber to melt out the paraffin layer and to evacuate the space 252 left by removal of the paraffin, and an asbestos ring 257 is inserted between P-type layer 253 and the electrode 237 to seal the evacuated space.

According to this invention, the semiconductors of the mosaic panel 233 will create an electric current between the outside electrodes 236 and 237 when a temperature differential exists between the electrode plates 236 and 237.

Also the mosaic panel 233 will serve as a heat pump for transmitting heat from the electrode layer 237 to the electrode plate 236 when the same are connected in an electrical circuit. It can be used for individual transistor cooling when one complete section is placed at "base" of transistor.

Referring to FIGS. 16 and 17, an arrangement is shown in FIG. 16 employing mosaic panels of the type 233 just described, for cooling exhaust gases from an internal combustion engine designated by reference numeral 265. The exhaust of the engine is connected by a conduit 266 to a gas filter unit 267.

In the conduit 266 there is a mosaic panel 268 corresponding in construction to the mosaic 233 and arranged in the conduit with the electrode plate 236' thereof disposed inwardly of the conduit and the electrode plate 237' thereof facing outwardly from the conduit. As the hot exhaust gases flow through the conduit, they will heat the electrode plate 236' to a temperature higher than that of the exposed electrode plate 237' whereby the mosaic will generate an electric current passing between its plates.

Downstream of the generator is a heat pump 270 secured gas-tight in the wall of the conduit and consisting of another mosaic panel 272 of identical structure to the mosaic panel 268 for the generator, but having its electrode plate 237″ disposed on the inside of the conduit and its electrode plate 236″ exposed to the outside of the conduit. The electrode plate 236′ of the generator mosaic panel 268 is connected by a conductor 274 to the outside electrode plate 236″ of the heat-pump mosaic panel 272. Similarly, a conductor 275 electrically connects the outside electrode 237″ of the generator panel to the inside electrode plate 237″ of the heat pump panel. Thus, the electric current generated by the mosaic 268 will cause current to flow through the mosaic of the heat pump thereby to extract further heat from the exhaust gases passing through the conduit to substantially reduce the temperature of the exhaust gases.

The gas filter 267 comprises a closed tank 278 having spaced apart partitions 279 and 280 supported therein. Such partitions divide the tank into an upper chamber 281, a middle chamber 282, and a lower chamber 283. Partition 280 has a plurality of tubes 285 depending therefrom and open in the partition at 286. The open lower end portion 287 of each tube is of enlarged cross-sectional area for accommodating valve balls 290 of polyethylene. The balls are movable axially in their respective tube enlargements to seat against and close the valve seats 289 of the steel tubes 285.

The lower chamber 283 is filled with a saturated aqueous solution 291 of ferrous sulfate, e.g. to a level above the level of the lower ends of the tubes 287. Saturation of the ferrous sulfate solution is maintained by the presence of crystals 292 of ferrous sulfate in the lower chamber. The buoyancy of the balls 290 will cause them to serve as check valves against the lower open ends of their respective tubes 285 thus to allow flow of gases from the middle chamber 282 through the tubes 285 and into the ferrous sulfate solution in the lower chamber. As the exhaust gases pass through the ferrous sulfate solution, certain components thereof, e.g. nitric oxide, will become dissolved in the ferrous sulfate solution. Also those combustion products having a boiling point above 25° C. will become dissolved in the ferrous sulfate solution. The harmless gases of carbon monoxide and carbon dioxide, for example, will pass through the ferrous sulfate solution to pass out through the exhaust tail pipe 293. For flow of the exhaust gases from the lower chamber to the upper chamber 281, the partitions 279 and 280 have openings 296 formed therein, there being check valve balls 297 floatable in nipples 298 positioned between the partitions 279 and 280 and disposed around their respective partition openings 286.

It is recognized that departures may be made from the illustrated embodiments and examples referred to herein within the scope of the invention, which is therefore not to be limited to the details disclosed, but is to be accorded the full scope of the appended claims.

What I claim is:

1. Apparatus for treating substances, comprising at least two ultrasonic transducers, means to mount the transducers at an angle with respect to each other whereby ultrasonic radiations propagated by the transducers will cross each other, means for exciting said transducers to emit ultrasonic radiations with the radiations emitted by one transducer being equal in frequency to the radiations emitted by the other transducer, and with the radiations crossing each other at their nodes, and a source of electromagnetic waves, means for actuating said source, said source being so disposed with respect to one of said transducers that some nodes of the waves from said source will coincide with points of intersection of the ultrasonic radiations.

2. The apparatus of claim 1, in which said electromagnetic waves are X-rays.

References Cited by the Examiner
UNITED STATES PATENTS

| | | | |
|---|---|---|---|
| 1,991,934 | 2/35 | McCray | 204—193 |
| 2,292,555 | 8/42 | Wesch | 250—81 |
| 2,295,294 | 9/42 | Ross | 25—156 |
| 2,337,569 | 12/43 | Pietschack | 250—167 |
| 2,463,569 | 3/49 | Smith | 204—193 |
| 2,500,008 | 3/50 | Richardson | 204—154 |
| 2,606,867 | 8/52 | Pianfetti et al. | 204—163 |
| 2,681,655 | 6/54 | Schade | 129—1 |
| 2,729,949 | 1/56 | Lindenblad | 62—1 |
| 2,738,172 | 3/56 | Spiess et al. | 204—154.1 |
| 2,762,722 | 9/56 | Truby | 117—106 |
| 2,777,813 | 1/57 | Totzek | 204—193 |
| 2,782,043 | 2/57 | Andrews | 274—41.4 |
| 2,791,561 | 5/57 | Beller et al. | 252—62.5 |
| 2,833,527 | 5/58 | Kohl et al. | 261—11 |
| 2,845,894 | 8/58 | McIlvaine | 118—49.1 |
| 2,867,497 | 1/59 | Houdry et al. | 23—2 |
| 2,877,283 | 3/59 | Justi | 136—4 |
| 2,883,959 | 4/59 | Rodriguez | 118—49 |
| 2,888,939 | 6/59 | Nitsche | 204—154.1 |

WINSTON A. DOUGLAS, *Primary Examiner.*

JOHN R. SPECK, JOHN H. MACK, *Examiners.*